Jan. 11, 1966 H. L. SMITH, JR 3,228,462
HEAT EXCHANGE APPARATUS
Filed April 9, 1965 8 Sheets-Sheet 2
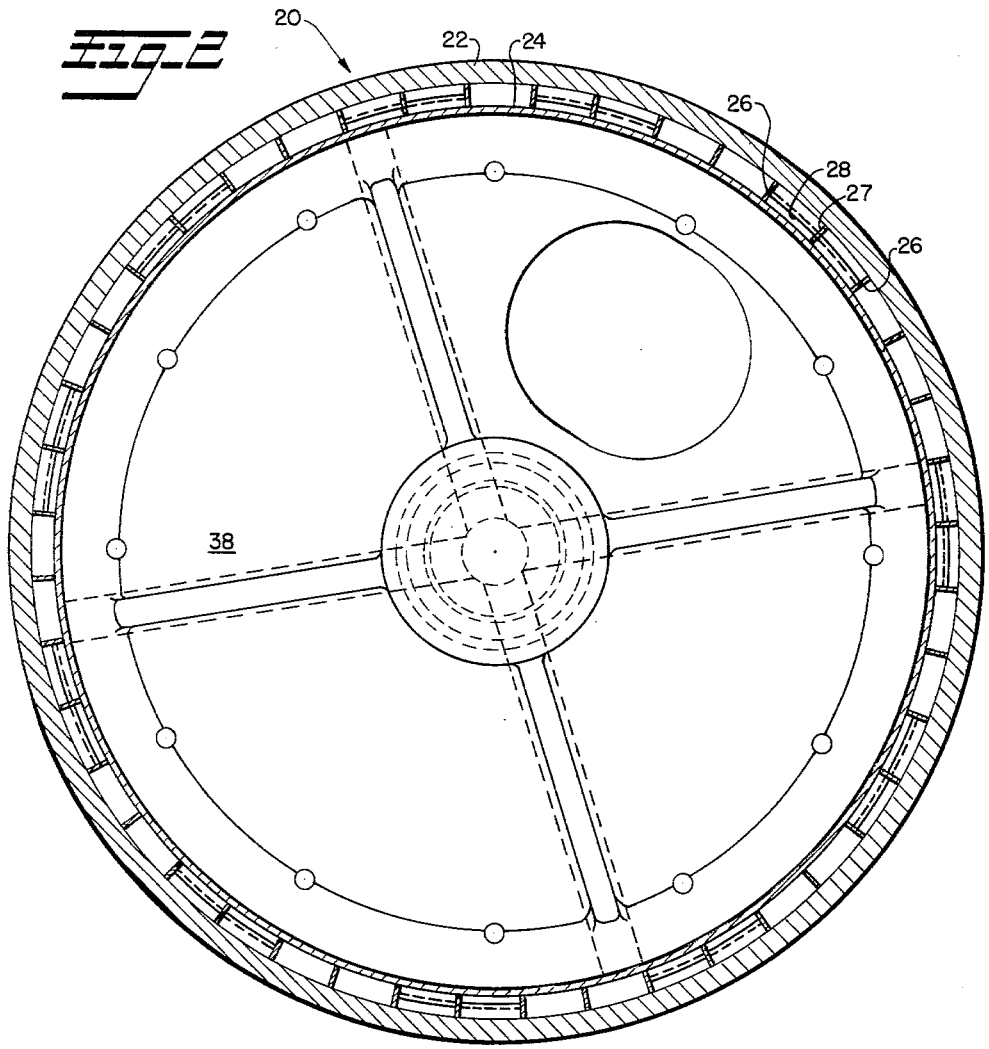
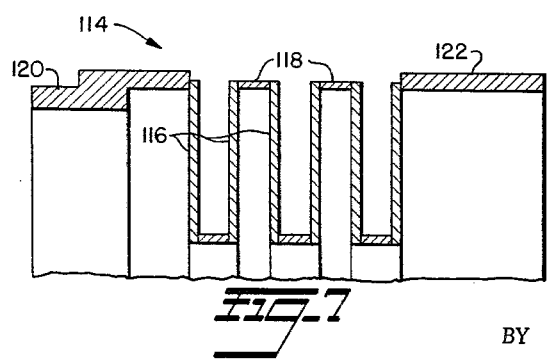
INVENTOR
HORACE L. SMITH, JR.
BY Strauch, Nolan, Neale,
Nies and Bronaugh
ATTORNEYS Jan. 11, 1966 H. L. SMITH, JR 3,228,462
HEAT EXCHANGE APPARATUS
Filed April 9, 1965 8 Sheets-Sheet 3

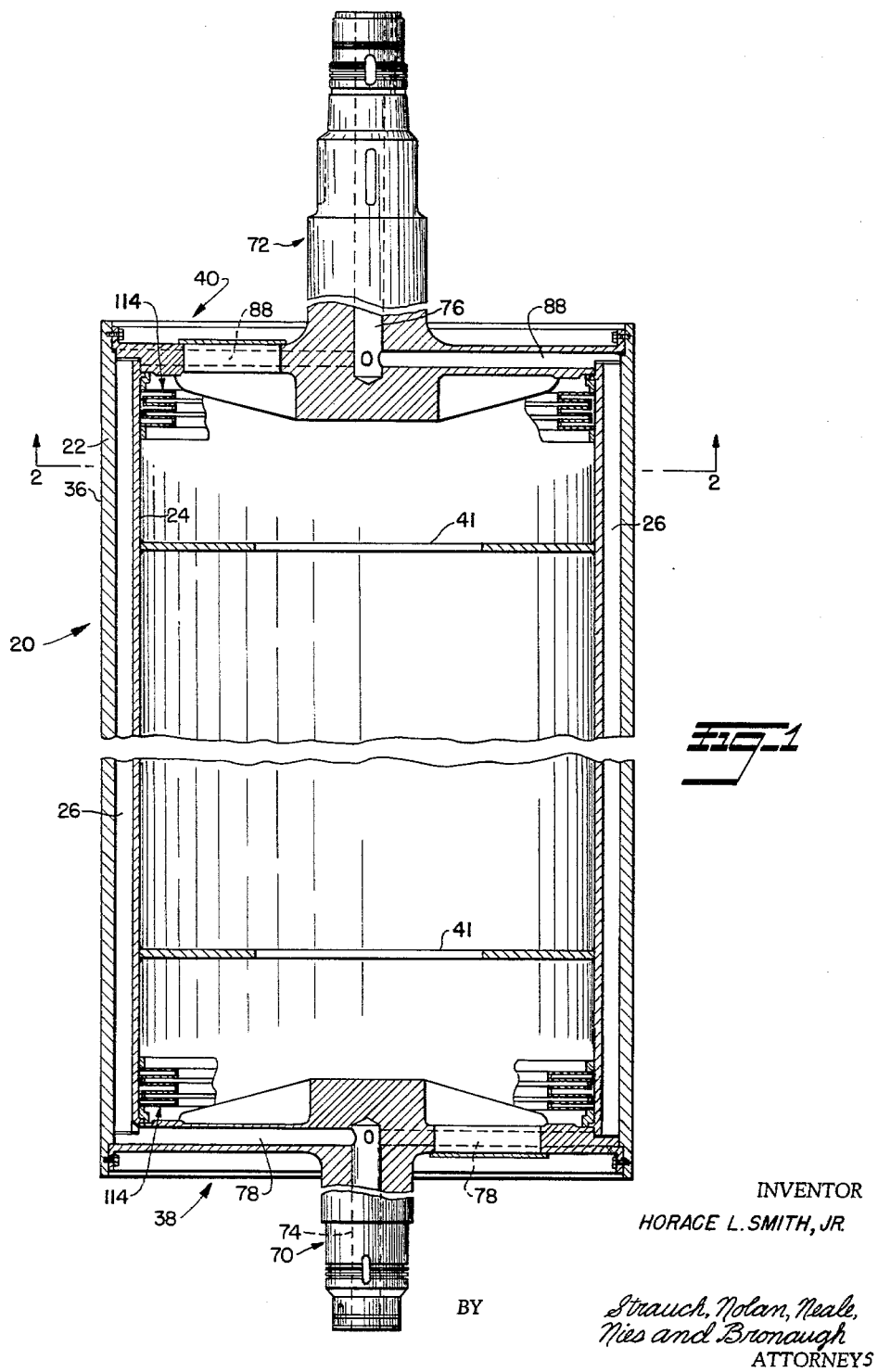

INVENTOR
HORACE L. SMITH, JR.

BY Strauch, Nolan, Neale,
Nies and Bronaugh
ATTORNEYS

Jan. 11, 1966    H. L. SMITH, JR    3,228,462
HEAT EXCHANGE APPARATUS
Filed April 9, 1965    8 Sheets-Sheet 4
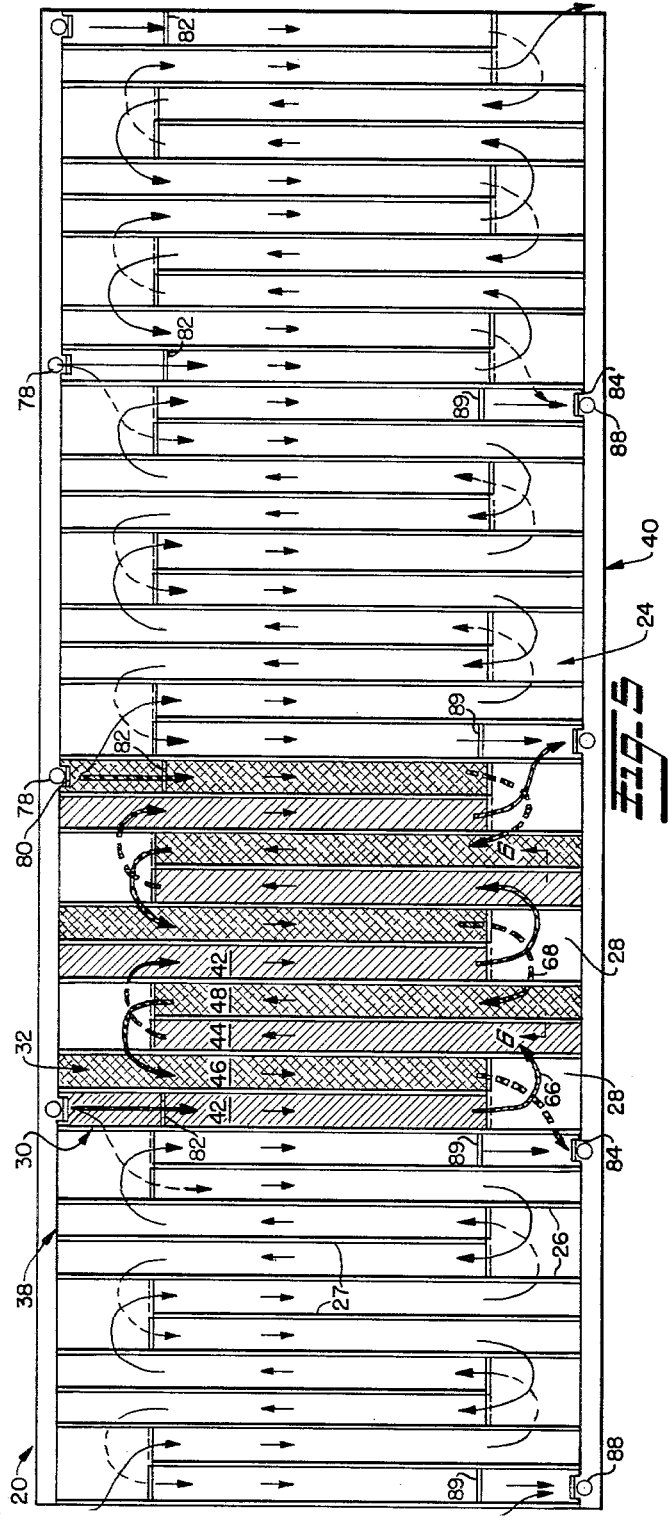
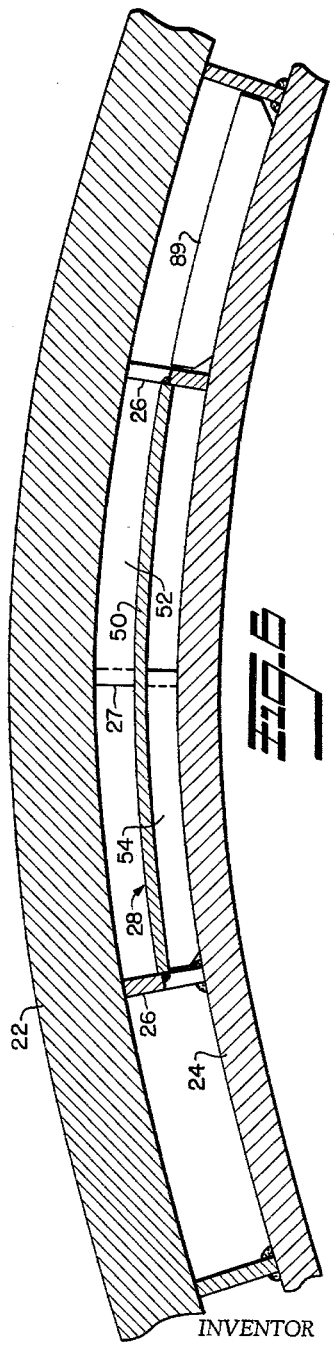
INVENTOR
HORACE L. SMITH, JR.
Strauch, Nolan, Neale,
Nies and Bronaugh
ATTORNEYS Jan. 11, 1966  H. L. SMITH, JR  3,228,462
HEAT EXCHANGE APPARATUS
Filed April 9, 1965  8 Sheets-Sheet 5
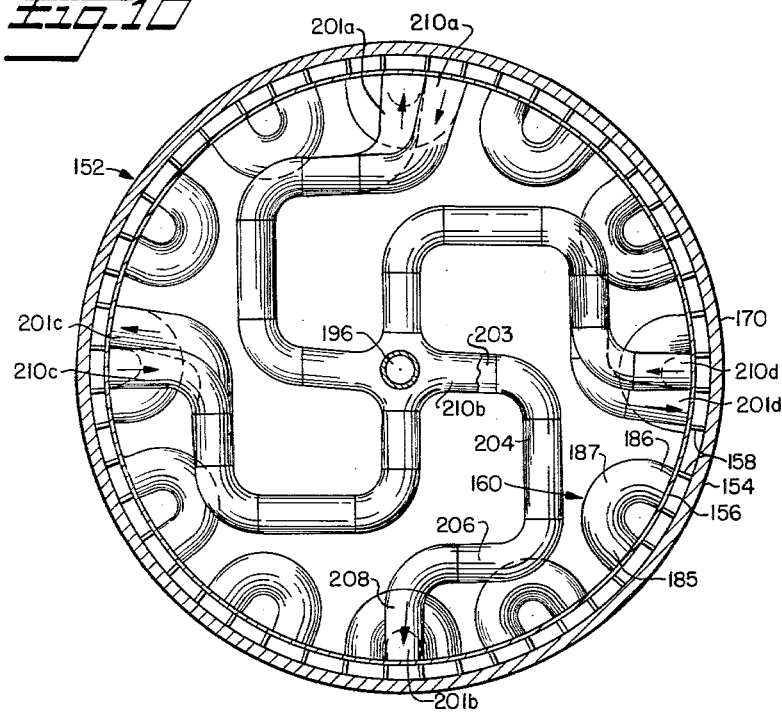
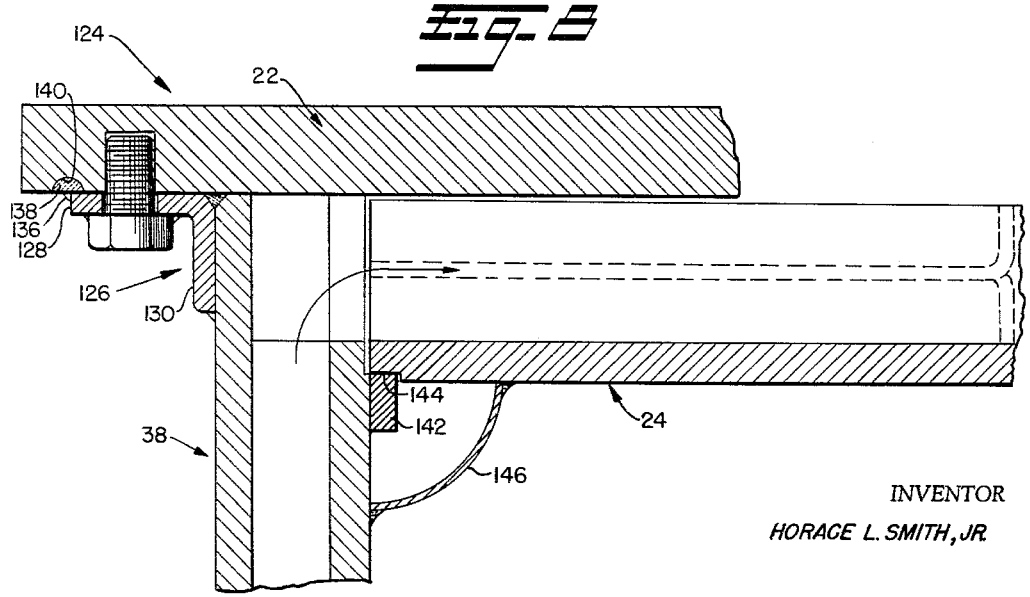
INVENTOR
HORACE L. SMITH, JR.
BY  Strauch, Nolan, Neale,
Nies and Bronaugh
ATTORNEYS

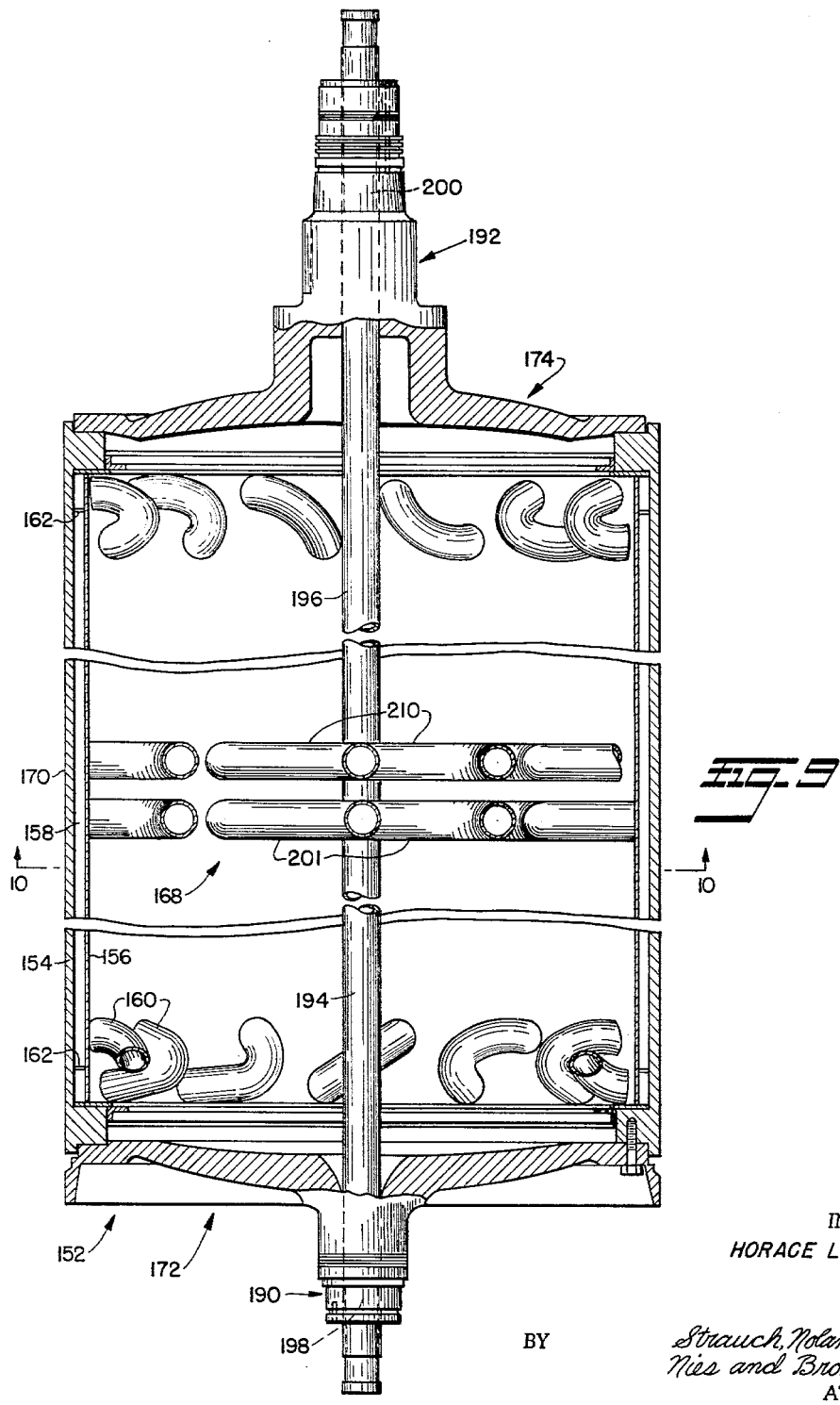

Jan. 11, 1966  H. L. SMITH, JR  3,228,462
HEAT EXCHANGE APPARATUS
Filed April 9, 1965  8 Sheets-Sheet 7

INVENTOR
HORACE L.
SMITH, JR.

Strauch, Nolan,
Neale, Nies &
Bronaugh
ATTORNEYS

Jan. 11, 1966 H. L. SMITH, JR 3,228,462
HEAT EXCHANGE APPARATUS
Filed April 9, 1965 8 Sheets-Sheet 8

INVENTOR
HORACE L. SMITH, JR.

BY Strauch, Nolan, Neale,
Nies and Bronaugh
ATTORNEYS

United States Patent Office 3,228,462
Patented Jan. 11, 1966

3,228,462
HEAT EXCHANGE APPARATUS
Horace L. Smith, Jr., Richmond, Va., assignor to Hupp Corporation, Cleveland, Ohio, a corporation of Virginia
Filed Apr. 9, 1965, Ser. No. 447,017
10 Claims. (Cl. 165—89)

This invention relates generally to heat transfer apparatus and, more specifically, to that class of heat exchangers commonly known as drum driers.

Certain wet web materials such as tissue paper, for example, are commonly dried on steam heated, revolving drums known as "Yankee" driers. As shown in United States Patent No. 3,061,944 issued November 6, 1962, to J. J. Kraus et al. for Paper Making Machine, in a Yankee drier the incoming wet sheet passes around a large pressure roller which presses the sheet against the revolving heated drum, squeezing out undesired fluids and air, which would otherwise have a deleterious effect on the final product. Pressure roll loads are normally in the order of 10–15,000 pounds. Loads of this magnitude may, due to the conventional Yankee drier's lack of rigidity, deflect the central portion of the surface of the drying drum, causing a non-uniform application of heat and pressure to the tissue paper and a consequent lack of final product uniformity. In an average size Yankee drier the drying drum may be on the order of 14 feet in diameter and 15 feet long, and the deflection caused by the pressure roller may be as great as 0.055 inch.

Another disadvantage of a conventional Yankee drier is that its surface temperature varies from place to place on the drum surface. Non-uniform surface temperatures also cause undesirable variances in the quality of the final product since the non-uniform temperatures cause differential heat losses, resulting in uneven drying of the product.

A third disadvantage of conventional Yankee driers is that steam is employed as the heating medium. To achieve even a minimal drying rate, the steam must be heated to a temperature on the order of 350° F. At this temperature steam has a vapor pressure of 135 p.s.i.a. This pressure is sufficiently high to require expensive, heavy duty system components in order to provide an adequate safety factor.

Numerous attempts have been made to increase the resistance of the drying drum to pressure roll deflection, to increase the uniformity of the drum's surface temperature, and to otherwise improve conventional Yankee driers. The most successful of the improved prior art drum driers are those shown in my copending applications Nos. 118,439 filed June 20, 1961, for Heat Transfer and Pressure Applying Apparatus and Method of Manufacture Thereof (now Patent No. 3,181,605 issued May 4, 1965) and 289,935 filed June 24, 1963, for Drum Type Heat Transfer Apparatus (now Patent No. 3,177,932 issued April 13, 1965). The present invention represents an improvement over the drum driers disclosed in my previous applications. It is simple and economic to manufacture, provides a more uniform surface temperature than the driers disclosed in my earlier applications, and is equally resistant to pressure roller induced deflection of the drum. In addition, it has less internal flow resistance (which reduces the pressure drop through the drum and, therefore, the power required to circulate the heat transfer medium through it) and is less susceptible to leakage of the heat transfer medium from the drum.

In general, drum driers according to the present invention include concentrically disposed inner and outer shells separated by longitdinally extending, radially oriented, equiangularly spaced partitions and circular end walls or heads which close the space between the inner and outer shells and to which axles for rotatably supporting the drier are attached. The trapezoidally sectioned passages between the partitions are connected by novel flow directing or diverting members into two or more independent, internested, labyrinthine flow channels extending around the periphery of the drum. A novel heat transfer fluid supply and return system is employed to introduce heat transfer fluid into and cause it to flow in opposite directions through the internested channels.

Preferably, the locations at which the heat transfer fluid is introduced into and removed from the flow channels are so selected that the distance through which the fluid flows in each of the channels is substantially equal. In addition, in the present invention, the hotter legs of one channel are disposed adjacent the cooler legs of the channel in which it is nested. As a result of the foregoing, the temperatures in adjacent channels tend to equalize; and the entire surface of the outer shell is maintained at a highly uniform temperature.

Further benefits of this novel construction are that the drum driers of the present invention are extremely resistant to pressure roller induced deflection and are simple and economical to fabricate.

Also, because of the novel flow directing members employed in the present invention, the circulating heat transfer fluid encounters substantially less resistance as its direction is changed at the ends of the drier than in prior drum driers. Consequently, there is a lower pressure drop in the drum driers of the present invention than in those heretofore known; and less power is required to circulate the heat transfer fluid through the drier, providing a substantial reduction in operating cost.

Another novel feature of the present invention is the provision of novel seals for the joints between the drier shells and drier heads. The seals of the present invention solve another problem common in drum driers heretofore known; viz., that of preventing the circulating fluid from leaking between the drier shells and the drier heads.

Preferably, the novel drum driers of the present invention are heated by liquid hydrocarbons which may be heated to temperatures of 500–800° F. and higher without boiling or decomposing to a significant extent. The heat transfer medium is circulated in liquid form at low pressure, eliminating the disadvantages attending high temperature steam and yet permitting higher surface temperatures to be attained than are practical in steam heated drum driers.

It is a primary object of the present invention to provide novel, improved drum driers.

Another object of the present invention resides in the provision of drum driers which are simple and economical to construct.

Yet another object of the present invention resides in the provision of drum driers which are rigid and resistant to pressure roller induced deflections.

Another important object of the present invention is the provision of drum driers capable of providing uniform surface temperatures.

In conjunction with the preceding object, it is a further specific object of the present invention to provide drum driers having a multiplicity of independent, internested, labyrinthine flow channels through which a heat transfer liquid may be circulated in opposite directions to maximize the uniformity of the drum's surface temperature.

Yet another important object of the present invention is the provision of novel improved drum driers which have a lower internal resistance to fluid flow than drum driers heretofore known and therefore require less power to circulate the heat transfer fluid, making them less expensive to operate.

A further important object of this invention is the provision of improved drum driers with novel end seals which prevent the heretofore unavoidable leakage of the heat transfer medium between the shells and heads of the driers.

A further object of the present invention resides in the provision of novel, improved drum driers adapted to be heated by a circulating liquid heat transfer medium to temperatures several hundred degrees higher than is practicable in conventional steam heated drum driers.

Further objects, additional advantages, and other novel features of the present invention will become more fully apparent from the appended claims and as the ensuing detailed description and discussion proceeds in conjunction with the accompanying drawing, in which:

FIGURE 1 is a longitudinal section through a drum drier constructed in accordance with the principles of the present invention, illustrating the fluid supply and return systems and their physical relation to the labyrinthine flow channels adjacent the periphery of the drier;

FIGURE 2 is a section through the drier of FIGURE 1, taken substantially along line 2—2 of the latter figure, showing the interrelation of the fluid return system, the flow channels, and the flow directing members employed to transfer fluid between successive legs of the flow channels;

FIGURE 5 is a development of the flow channels in the drier of FIGURE 1;

FIGURE 6 is a section through the drier of FIGURE 1, taken substantially aong line 6—6 of FIGURE 5;

FIGURE 7 is a section through an annular seal employed in the drier of FIGURE 1;

FIGURE 8 is a view similar to FIGURE 3, showing an alternate arrangement for assembling the inner and outer drier shells to the drier heads;

FIGURE 9 is a view, similar to FIGURE 1, of a second form of drum drier constructed in accord with the principles of the present invention;

FIGURE 10 is a section through the drier of FIGURE 9, taken substantially along line 10—10 of the latter figure;

Figure 3:
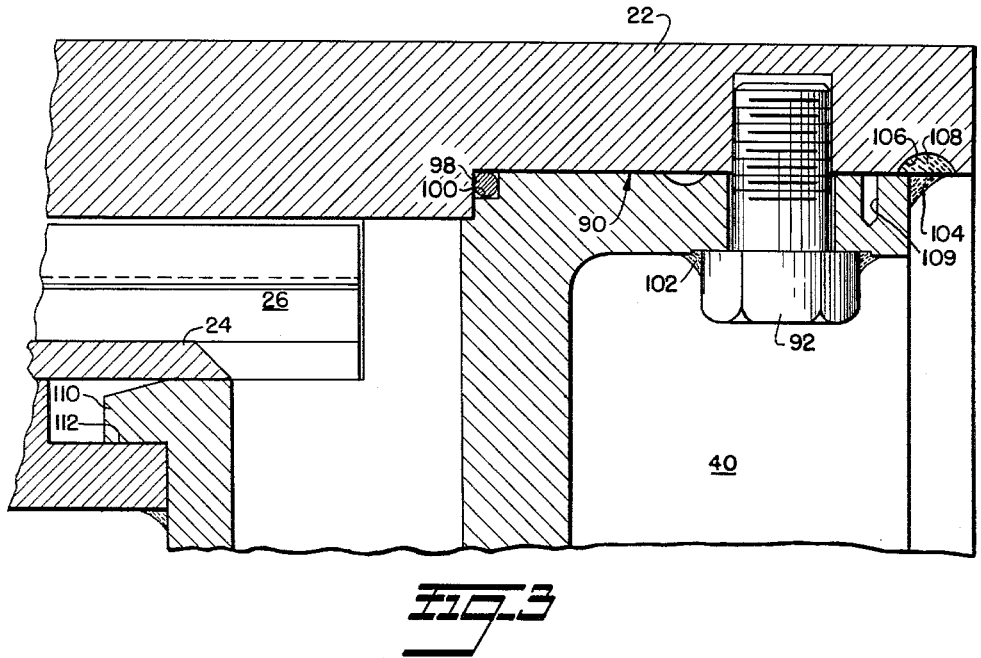
FIGURE 3 is a fragmentary section, similar to FIGURE 1 but to an enlarged scale, showing how the drier shells are fixed to the drier heads.

Referring now to the drawing, FIGURE 1 shows a rotatable drum drier 20 having an outer cylindrical shell 22 of heat conductive material, preferably cast iron, and an inner cylindrical shell 24. The inner and outer shells are separated by longitudinally extending, radially oriented, main partitions 26 and intermediate partitions 27. Partitions 26 and 27 form passages which are connected by flow diverters 28 into four pairs of internested, labyrinthine flow channels 30 and 32. A fluid supply and return system delivers a heated, preferably liquid, heat transfer medium to and causes it to flow in opposite directions through the two independent flow channels in each internested pair, thereby effecting a substantially uniform distribution of heat to the external surface 36 of outer drier shell 22. In one actual embodiment, the external surface of drier 20 is 60 inches in diameter and 224 inches long.

Outer shell 22, inner shell 24, partitions 26 and 27, and circular end walls or heads 38 and 40 are joined into a rigid unitary structure which is extremely strong and rigid and highly resistant to roll-induced deflections and other loads imposed upon drier 20. To further strengthen this structure and increase its resistance to deflection, bulkheads 41 are installed within and welded to inner shell 24.

One of the novel features of the present invention resides in employing a high boiling point hydrocarbon liquid as the circulating medium, permitting it to be circulated at extremely high temperature in liquid form and under low pressures. Consequently, drum drier 20 may be heated to high temperatures and yet it and the other heating system components need be designed to withstand only very low pressures. One suitable heat transfer liquid is Therminol FR-2, a chlorinated biphenyl produced at Monsanto Chemical Company. A preferred system for heating and circulating the heat transfer medium is discussed in detail in my copending application No. 237,817 filed November 15, 1962, for High Temperature Heating Apparatus to which reference may be had if deemed necessary for an understanding of the present invention.

Referring now to FIGURE 5, main partitions 26 extend from one to the other of the two drier heads 38 and 40. As shown in FIGURE 8, however, the length of the main partitions is slightly less than the distance between the two heads, providing gaps (typically on the order of 0.125 inch) between the ends of the main partitions and the associated drier heads. This arrangement accommodates longitudinal expansion of the main partitions and differeneces in expansion between the inner and outer shells as the temperature of drier 20 increases.

Alternated with main partitions 26 are intermediate partitions 27, which have one end juxtaposed to one of the two drier end walls 38 or 40 and the other end substantially spaced from the other end wall. Successive intermediate partitions 27 abut opposite ones of the two end walls 38 and 40.

As is best shown in FIGURE 5, flow channel 32 includes straight runs or legs 42 and 44 defined, respectively, by successive pairs of main and intermediate partitions 26 and 27, channel legs 42 and 44 being the passages between the two partitions in each successive pair of partitions. There are also passages 46 and 48 between the pairs of main and intermediate partitions 26 and 27 defining passages 42 and 44. Passages 46 and 48 constitute the runs or legs of flow channel 32.

Figure 4:
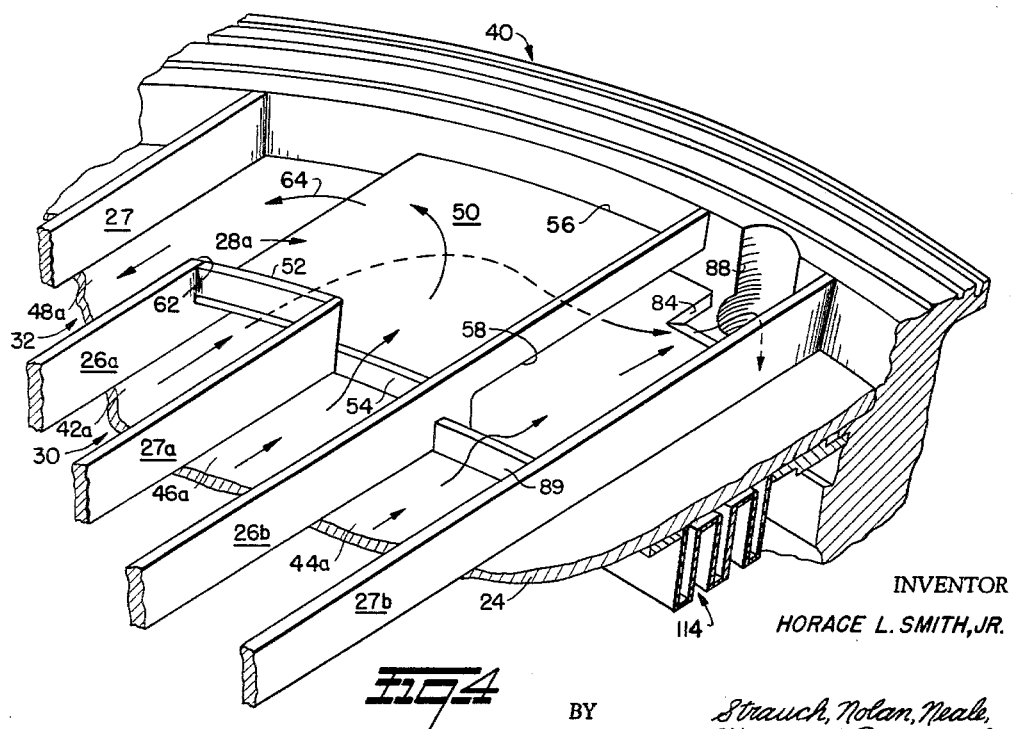
FIGURE 4 is a fragmentary perspective of one end of the drum drier of FIGURE 1 with the outer shel removed, showing the flow passage forming partitions and the flow diverting members and how the latter divert the fluid medium from one flow passage into another.

Referring now to FIGURES 4 and 5, passages 42 and 44 are serially connected together to form the first labyrinthine flow channel 30 and passages 46 and 48 are serially joined to form the second labyrinthine flow channel 32 by the flow diverters 28 mentioned above. Flow diverters 28 are fabricated from bar stock (or metal sheet or plate) and have an arcuately sectioned body 50 and end members 52 and 54 extending in opposite directions from the diverter body. Diverters 28 are fixed, as by welding, approximately midway between and generally parallel to inner and outer drier shells 24 and 22.

The construction and mounting of the diverters is best illustrated in FIGURE 4, in which a typical flow diverter 28a is shown. Referring now to the latter figure, the two sides of flow diverter 28a are fixed to a pair of adjacent main partitions 26a and 26b with the diverter spanning the space between the partitions. The outer end 56 of the diverter abuts drier end wall 40. At the opposite or inner end of the diverter, diverter end member 52 extends between one of the main partitions (26a) spanned by the diverter and intermediate partition 27a and engages outer shell 22. Thus, diverter end portion 52 directs fluid flowing in the passage 42a defined by partitions 26a and 27a between diverter body 50 and inner shell 24.

The second diverter end member 54 spans the space between intermediate partition 27a and main partition 26b and engages inner shell 24. End member 54 directs fluid flowing in the channel 46a defined by the partitions just mentioned over the diverter; i.e., between diverter body 50 and outer shell 22.

Referring still to FIGURE 4, the lower part of partition 26b is cut away over a distance equal to the length of diverter 28a to provide a passage 58 through which the fluid flowing from channel 42a between the diverter and inner shell 24 can pass into the passage 44a of flow channel 30 between main partition 26b and the next adjacent intermediate partition 27b.

Similarly, the upper half of the right-hand end portion of main partition 26a is cut away to provide a passage 62 through which the fluid flowing from passage 46a of channel 32 between diverter 28a and outer shell 22 can flow into the next leg 48a of channel 32 as shown by arrows 64.

Referring now to FIGURE 5, the other flow diverters 28 (which are identical to the flow diverter just described) are arranged between each main partition 26 and the adjacent main partition with successive diverters 28 at opposite ends of the partitions. This connects passages 42 and 44 into one continuous channel 30 and flow passages 46 and 48 into the second continuous channel 32 as shown by arrows 66 and 68, respectively, in FIGURE 5.

Referring again to FIGURE 1, the fluid supply and return system of drier 20 includes a pair of axially aligned, hollow axles 70 and 72, integral with drier heads 38 and 40, by which drier 20 is rotated. Axially extending main supply and return passages 74 and 76 are formed in axles 70 and 72.

Communicating with main supply passage 74 are a plurality (six in the illustrated embodiment) of radially extending branch supply passages 78 drilled or otherwise formed in drier head 38 at uniformly spaced intervals. At their inner ends, branch passages 78 communicate with axial main passage 74. At their outer ends, they communicate with flow channels 30 and 32. As is best shown in FIGURES 3 and 4, notches 80, cut in the ends of inner shell 24, permit the circulating heat transfer medium to flow from main supply passage 74 into the inlet ends of the flow channels. Transversely oriented pressurizing equalizing dams 82 are installed in the flow channels adjacent the outlet ends of branch passages 78 to insure uniform flow of the heat transfer medium.

After circulating through flow channels 30 and 32, the heat transfer medium flows through notches 84 in the end of inner shell 24 adjacent drier head 40 into radially extending branch return passages 88 drilled or otherwise formed at uniformly spaced intervals in drier end wall 40. At their inner ends, branch return passages 88 communicate with the axially extending main return passage 76 in axle 72. Pressure equalizing dams 89, similar to those described previously, are installed in flow channels 30 and 32 adjacent the outlet ends of branch return passages 88.

Referring now to FIGURE 5, the heat transfer medium flows into drum drier 20 through the axial passage 74 in axle 70, then through radial passages 78, and the notches or passages 80 in inner shell 24 into flow channels 30 and 32. After circulating through channels 30 and 32, the circulating medium flows through passages 84 into radial branch return passages 88 and out the main return passage 76 in axle 72.

As a result of the manner in which the heat transfer medium is introduced into, circulated through, and exhausted from drier 20, eight flow paths are set up in the drier, four in the four flow channels 30 and four in the four flow channels 32. Two of these flow paths are shown by hatching in FIGURE 5. As illustrated by the hatching, the fluid flows in opposite directions in adjacent legs of channels 30 and 32 so that there is true counterflow of the heat transfer medium in and throughout the two flow channels.

Moreover, as also shown in FIGURE 5, in each pair of cooperating flow paths the channel leg through which the heated fluid enters a flow path in a channel 30 is immediately adjacent the channel leg from which much cooler fluid is exhausted from the flow path in the corresponding channel 32. As a result, the two flow paths have the same length; and, because there is counterflow in the two channels, the hottest fluid in one flow path circulates immediately adjacent the cooler circulating medium in the co-operating flow path.

Heat is transferred from the hotter circulating medium in one channel through the intervening heat conductive partitions 26 and 27 to the much cooler fluid flowing in the adjacent leg of the other flow channel so that the temperature of the fluid in adjacent legs and at points lengthwise of the drier is equalized and outer shell 22 of drier 20 is heated at a highly uniform rate throughout its extent. As outer cylindrical shell 22 is preferably fabricated of a homogeneous material and has a uniform thickness throughout, heat is transferred from its inner to its outer surface at a substantially uniform rate; and, as a result, the exterior temperature of the drum drier is highly uniform.

Another important feature of the present invention is the arrangement provided for assembling the inner and outer drier shells 24 and 22 to end walls or heads 38 and 40. The novel arrangement described hereinafter for accomplishing this prevents leakage of the heat transfer medium from the fluid supply and return system or from flow channels 30 and 32 to the interior or exterior of dried 20, a common failing of similar, heretofore available driers. Both end walls are assembled to the inner and outer drier shells in the same manner; and, therefore, only the assembly of end wall 40 to the shells will be described.

Referring now to FIGURES 1, 3, and 7, end wall 40 fits in an annular groove 90 in outer shell 22 and is fixed to the outer shell by bolts 92 and dowel pins (not shown), which are alternated with bolts 92 around the circumference of the shell and head. To prevent leakage between end wall 40 and outer shell 22, an O-ring 98 is disposed between the end wall and outer shell in an annular notch 100 in the end wall.

Leakage is further prevented by welding a bead 102 around each of the bolts 92 and the dowel pins and by welding a bead 104 around the joint between the outer end of drier head 40 and outer shell 22. Inasmuch as outer shell 22 is normally fabricated of cast iron, the latter weld is preferably made by forming a groove 106 in the inner surface of drum dried shell 22, filling groove 106 with a bead of weld metal 108, and welding bead 104 between the dried head and bead 108. An annular groove 109 in end wall 40 adjacent its outer end face and opening onto its periphery relieves the stresses resulting from the welding of beads 104 and 108.

Inner shell 24 is supported in concentric relation to outer shell 22 by an annular projection 110 extending inwardly from the inner end of head 40. Projection 110 fits in an annular notch 112 formed in the exterior surface of the inner shell. As shown in FIGURE 3, there is a small gap between the end of inner shell 24 and end wall 40. This gap accommodates relative longitudinal expansion between the inner and outer shells 24 and 22 as drier 20 is heated.

Leakage of heat transfer medium to the interior of inner drum 24 is prevented by employing the novel annular seal 114 illustrated in FIGURE 7. As shown in the latter figure, seal 114 is of the accordion type having a labyrinthine like configuration and consists of series of thin, flexible, parallel, transversely extending annular rings 116 (six in the illustrated embodiment of the invention), longitudinally oriented rings 118 welded between adjacent rings 116 with alternate rings 118 at the outer and inner edges of rings 116, and mounting rings or seal portions 120 and 122 welded to the end rings 116 adjacent their outer edges. Mounting ring 120 is welded to end wall 40 (or 38), and mounting ring 122 is welded to the inside of inner shell 24 to seal the joints between the latter components. The novel construction just described permits seal 114 to flex and thereby accommodate relative expansion of the drum drier components. In one typical embodiment of the present invention, rings 116 are fabricated of #11 guage black sheet steel and are about 2⅝" wide, rings 118 are fabricated from ½" x ⅛" steel bars, and rings 120 and 122 are respectively fabricated from ⅜" and ⅝" thick steel bars.

FIGURE 8 illustrates an alternate arrangement for assembling the drum drier components. In the drum drier 124 illustrated in this figure, a cricular angle 126 having mutually perpendicular legs 128 and 130 is welded to the outside of dried end wall 38. Outer shell 22 is fixed to the leg 128 of angle 126 by welding an annular bead 136 between leg 128 and a bead 138 in a groove 140 around the periphery of the outer shell. In addition to joining the end wall and outer shell, the weld metal seals the joint between these components.

In this embodiment of the present invention, inner shell 24 is supported in concentric relationship to outer shell 22 by an annular ring 142 welded to the inside of end wall 38. Ring 142 fits in an annular recess 144 in the end of the inner shell. To prevent the heat transfer medium from leaking into the interior of the inner shell, an arcuately sectioned annular ring 146 is welded to the inside of end wall 38 and to the inner surface of inner shell 24. This ring need not necessarily have an arcuate section as any section which will accommodate flexure of the ring is satisfactory.

Figure 11:
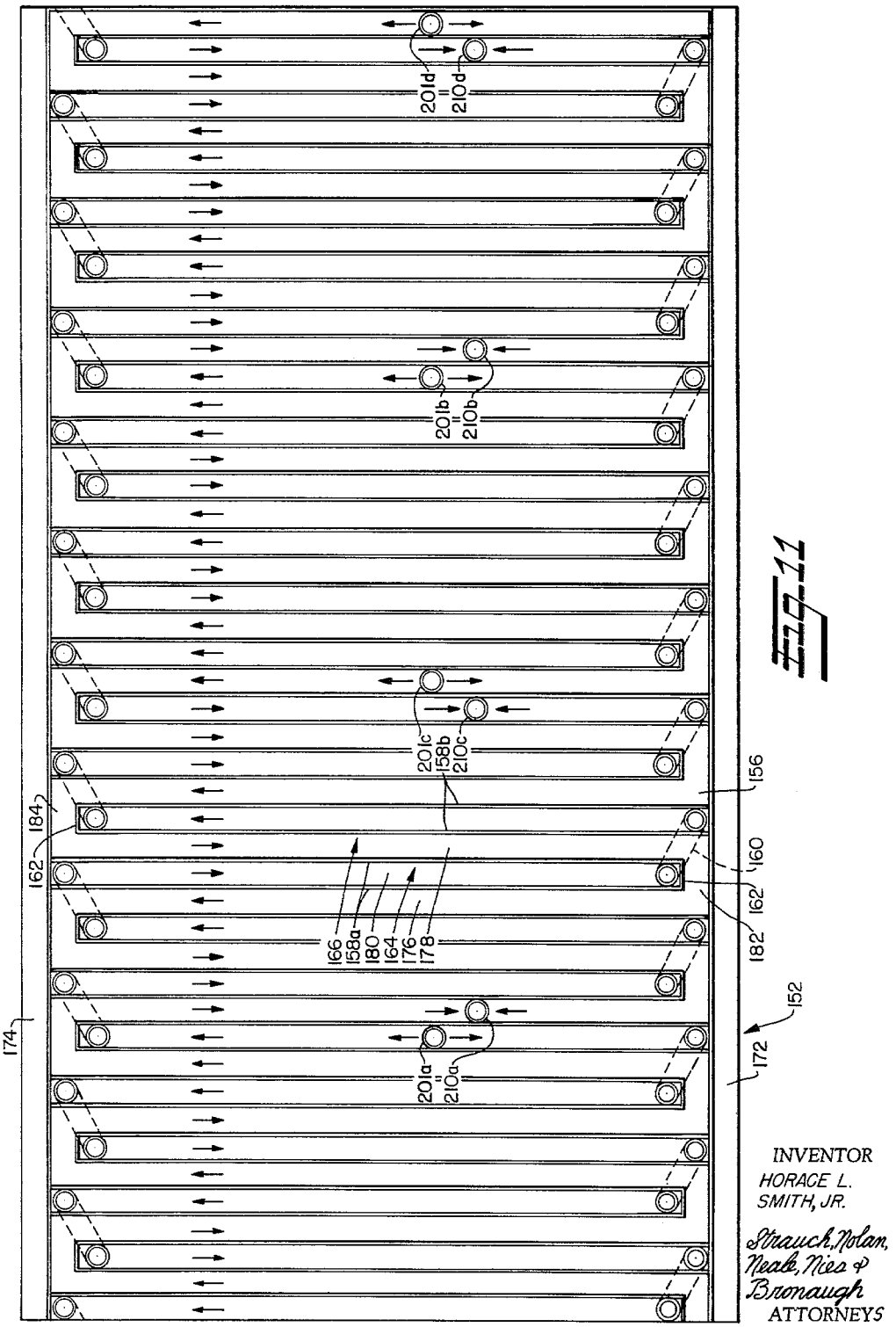
FIGURE 11 is a development of the flow channels in the drier of FIGURE 9.

FIGURES 9–11 illustrate another form of drum drier constructed in accord with the principles of the present invention. The rotatable drum dried 152 illustrated in these figures has an outer cylindrical shell 154 of heat conductive material (preferably cast iron) and an inner cylindrical shell 156. The dried shells are separated by longitudinally extending, radially oriented partitions 158 which are connected by U-shaped tubes 160 and transverse partitions 162 into two internested, labyrinthine flow channels 164 and 166. A fluid supply and return system 168 delivers a heated, preferably liquid, heat transfer medium to and causes it to flow in opposite directions through the two independent flow channels, thereby effecting a substantially uniform distribution of heat to the external surface 170 of outer drier shell 154. Outer shell 154, inner shell 156, partitions 158 and 162, and a pair of circular end walls 172 and 174 are joined as by welding into a rigid unitary structure which, like the previously described embodiment of the present invention, is extremely strong and rigid and highly resistant to pressure roll induced deflections and other loads.

Referring now to FIGURE 11, one pair of adjacent partitions, identified by reference character 158a, terminates in spaced relationship to the left-hand end wall 172 of drum drier 152. The adjacent pair of partitions, identified by reference character 158b, terminates in spaced relationship to the right-hand end wall 174 of the drier. The two ends of the partitions in each pair which are spaced from a drier end wall are connected by a transverse partition 162. This pattern is continued around the drum drier, each pair of partitions 158a being separated by a pair of partitions 158b and the exposed ends of each pair of partitions being connected by a transverse partition.

Flow channel 166 includes alternate straight runs or legs 176 and 178 which are the passages between the two partitions in the pairs of partitions 158a and 158b. The U-shaped fluid transfer tubes 160 are employed to connect the passage between each of partitions 158b, providing fluid communication between successive channel legs 176 and 178. As shown best in FIGURE 11, the fluid transfer tubes 160 are alternately disposed at opposite ends of drum drier 152 so that the heat transfer medium flows alternately to the left and to the right through legs 176 and 178, traveling in a labyrinthine or zig-zag path through flow channel 166.

As is also shown in FIGURE 11, flow channel 164 consists of straight runs or legs 180, each of which is disposed between two of the legs 176 and 178 of flow channel 166. By terminating partitions 158a and 158b short of end walls 172 and 174, passages 182 and 184 are alternately provided at opposite ends of drum drier 152 between the U-shaped fluid transfer tubes 160 and the associated ends of the drum drier. These passages allow the fluid in channel 164 to flow around the ends of the tubes so that it alternately flows to the left and to the right through flow channel 164, traveling back and forth in a labryinthine or zig-zag path around the periphery of the drier.

The U-shaped fluid transfer tubes 160, which may be fabricated from any appropriate size and type of tubular stock, each consist of a pair of substantially parallel, spaced apart legs 185 and 186 separated by a semi-circular, integral connecting portion 187. Referring now to FIGURES 10 and 11, fluid transfer tubes 160 are fixed, as by welding, to inner drier shell 156 with the ends of legs 185 and 186 extending through the inner shell into communication with the flow channel legs they connect.

Referring again to FIGURES 9 and 10, the fluid supply and return system 168 of this embodiment of the present invention includes a pair of axially aligned hollow axles 190 and 192, integral with drier end walls 172 and 174, by which drum drier 152 is rotatably supported. Fixed to the inner ends of axles 190 and 192 and extending longitudinally of the drier are main supply and return conduits 194 and 196, which communicate with the axial flow passages 198 and 200 through axles 190 and 192. The inner ends of conduits 194 and 196 are joined and plugged to prevent fluid from passing directly from one conduit into the other.

A plurality (four in the illustrated embodiment) of radially extending branch supply conduits 201 communicate with the interior of main supply conduit 194 (to which they are fixed as by welding) adjacent its plugged or inner end. At their outer ends, branch conduits 201 extend through drier inner shell 156 (to which they are fixed as by welding) into communication with flow channels 164 and 166. As shown in FIGURE 11, each of the branch tubes has a first radially extending leg 203, second and third legs 204 and 206 which are respectively normal and parallel to the first leg, and a fourth leg 208 connected between the third leg and one of the flow channels 164 or 166. This novel arrangement provides the flexibility required to accommodate stresses resulting from expansion and contraction of the branch tubes.

Referring now to FIGURE 11, two of the branch supply conduits (201a and 201b) communicate with flow channel 164 at locations substantially at the longitudinal midpoint and on opposite sides of drum drier 152. The remaining branch supply conduits (201c and 201d) communicate with flow channel 166, also substantially at the longitudinal midpoint of drum drier 152 but midway between conduits 201a and 201b. Thus, the circulating heat transfer medium is introduced into the flow channels at substantially the longitudinal midpoint of drum drier 152 and at points substantially equidistantly spaced apart around its circumference.

Four radially extending branch return conduits 210a–d, having the same configuration as supply conduits 201, are connected between main return conduit 196 and flow channels 164 and 166 in substantially the same manner as the branch supply conduits. At their inner ends branch return conduits 210a–d communicate with the interior of main return conduit 196 to which they are fixed as by welding.

The heated, circulating fluid heat transfer medium flows into drum drier 152 through the axial passage 198 in axle 190, then through the longitudinally extending main supply conduit 194 into branch conduits 210a–d and outwardly through the branch conduits into flow channels 164 and 166. At the juncture of each branch supply conduit and a flow channel, the stream of liquid divides and flows in opposite directions through the channel, as shown by the arrows in FIGURE 11. The circulating medium then flows into branch return conduits 210a–d and through main return conduit 196 and the passage 200 in axle 192 to the exterior of drier 152.

Because of the manner in which the heat transfer medium is circulated through drier 152, there is counterflow in channels 164 and 166 and equilization of the temperature of the circulating medium in adjoining legs of the two channels. Consequently, the exterior surface of the drier has a highly uniform temperature for the reasons discussed previously.

Figure 12:
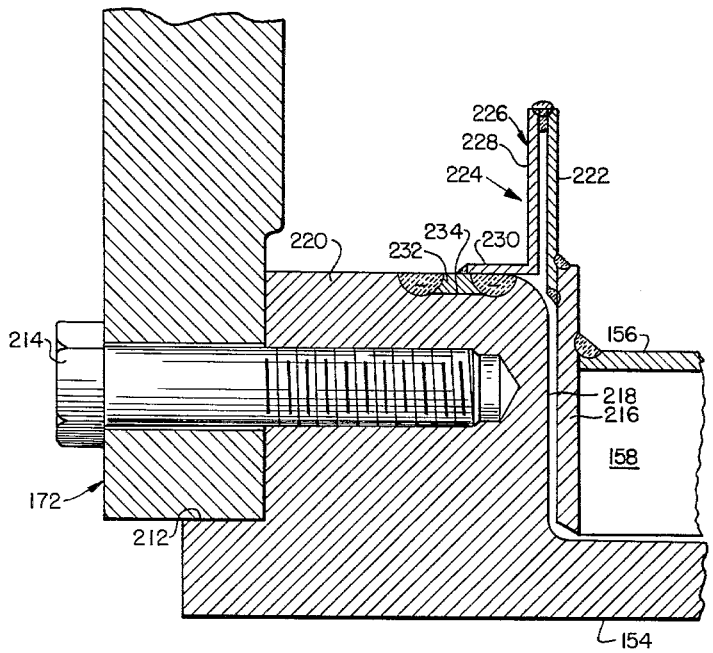
FIGURE 12 is a view, similar to FIGURE 8, showing the manner in which the inner and outer shells of the drier of FIGURE 9 are connected to its heads.
Figure 13:
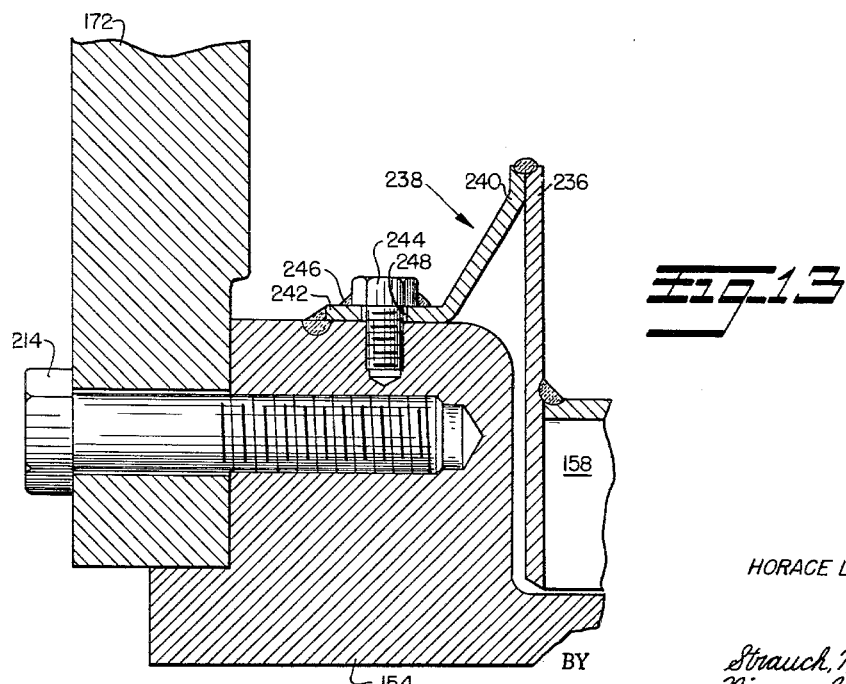
FIGURE 13 is a view, similar to FIGURE 12, showing an alternate arrangement for connecting the shells and the heads of the drier of FIGURE 9.

FIGURES 12 and 13 illustrate arrangements for connecting the end walls 172 and 174 of drier 152 to inner and outer shells 156 and 154. As these are identical at both ends of the driers, only the connection between end wall 172 and the drier shells will be described.

Referring first to FIGURE 12, in the arrangement shown in this figure, drum drier end wall 172 is fixed in an annular recess 212 in the end of outer shell 154. Inner shell 156 and partitions 158 are fixed, as by welding, to a flat annular ring 216 positioned adjacent an annular shoulder 218 formed by an inwardly extending portion 220 of the outer shell. Supporting ring 216, in turn, is welded to an annular ring 222, which is one component of a bipartite seal 224 provided to prevent the heat transfer medium from leaking to the interior of the drier.

Ring 222 is fixed, as by welding, to the second component of seal 224, which is an annular ring 226 having mutually perpendicular legs 228 and 230. Ring 222 is welded to leg 228. Leg 230 is welded to a bar 232 welded in an annular recess 234 in the outer shell.

The arrangement shown in FIGURE 13 is similar to the arrangement of FIGURE 12 except that support ring 216 and seal component 222 are replaced with a single support ring 236, which combines the functions of the components just mentioned. In addition, in the arrangement of FIGURE 13, the L-shaped seal member 226 is replaced with a V-shaped annular seal 238 having legs 240 and 242. Leg 240 is welded to support and sealing ring 236. Seal leg 242 is fixed, as by bolts 244, to outer shell 154. A bead 246 is welded around each bolt head to seal the aperture 248 in seal 238 through which the bolt extends; and the free edge of seal leg 242 is welded to the outer shell to seal the joint between these components.

As in the embodiments of the present invention described previously, the assembly of inner shell 156 and partitions 158 is purposely shorter than the distance between the two shoulders 218 of the end walls to accommodate longitudinal expansion of the inner shell and partitions. Both types of seals just described have sufficient flexibility to accommodate such expansion. Also, as shown in the foregoing figures, a gap may be left between the outer edges of the partition (and the periphery of support ring 216 or 236) and the inside of outer shell 154 to accommodate radial expansion of the support ring and partitions as drier 152 is heated, an arrangement which may also be employed in drum driers of the type shown in FIGURES 1–7.

Although the sealing arrangements of FIGURES 12 and 13 have been described in conjunction with the type of drum drier illustrated in FIGURES 9–11, it is to be understood that these sealing arrangements can also be used with the drier of FIGURES 1–7, if desired; and that the sealing arrangements described in conjunction with the latter embodiment can be employed with the drier of FIGURES 9–11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Heat exchange apparatus adapted to have a fluid heat transfer medium circulated therethrough to maintain an external surface of said apparatus at a uniform, predetermined temperature, comprising:
   (a) concentric, spaced apart inner and outer shells;
   (b) end walls fixed to said shells at the opposite ends thereof;
   (c) longitudinally extending, radially oriented partitions separating and spanning the space between the inner and outer shells and dividing said space into a plurality of longitudinally extending passages;
   (d) means connecting the passages between said partitions into at least two independent, internested, labyrinthine flow channels, including:
   (e) flow diverting members located alternately at opposite ends of said apparatus and between the inner and outer shells, successive ones of said members spanning adjacent pairs of passages; and
   (f) means alternately located at opposite ends of said apparatus and comprising the flow diverting member thereat establishing communication from a first one of the pair of passages spanned by said member between said member and the inner shell to the passage adjacent the second passage in said pair and from said second passage between said member and the outer shell to the passage adjacent the first passage in said pair of passages; and
   (g) means comprising a heat transfer fluid supply and return system for introducing heat transfer fluid into and causing it to flow in opposite directions through said channels, said system including radially extending passages in said end walls, passages in said end walls between said radial passages and the annular space between said inner and outer shells, and horizontally extending centrally located passages in said end wall communicating with said radial passages and adapted to be connected to a source of heat transfer fluid.

2. The heat exchange apparatus of claim 1, together with:
   (a) means fixing each of said end walls to said outer shell including means providing seals between said end walls and said outer shell;
   (b) annular projections on the inner sides of said end walls for engaging the inner surface of the inner shell and supporting it in concentric relation to the outer shell, the length of the inner shell being less than the distance between the inner sides of the end walls to accommodate linear expansion of said inner shell; and
   (c) a flexible annular seal at each end of said apparatus, each seal having a first portion fixed to the inner surface of the inner shell adjacent the end thereof and a second portion fixed to the inside of the associated end wall to prevent heat transfer fluid from leaking between said end walls and said inner shell to the interior of said apparatus.

3. The heat exchange apparatus of claim 1, together with means fixing said inner shell to said outer shell comprising, at each end of said apparatus, a first annular member sealingly fixed to the end of the inner shell, a second annular member sealingly fixed to the outer shell, and means sealingly fixing said first annular member to said second annular member.

4. The heat exchange apparatus of claim 3, wherein the means fixing the first annular member to the second annular member is an annular member having two mutually perpendicular legs, one of said legs being sealingly fixed in substantially parallel relationship to said second member and the other being sealingly fixed to said outer shell.

5. The heat exchange apparatus of claim 1, together with means fixing said inner shell to said outer shell comprising, at each of said apparatus, a first annular member sealingly fixed to the end of the inner shell and a second annular member having two angularly disposed legs, one of said legs being sealingly fixed to said first member and the second leg being sealingly fixed to the outer shell.

6. Heat exchange apparatus adapted to have a fluid heat transfer medium circulated therethrough to maintain an external surface of said apparatus at a uniform, predetermined temperature, comprising:
(a) concentric, spaced apart inner and outer shells;
(b) end walls fixed to said shells at the opposite ends thereof;
(c) longitudinally extending, radially oriented partitions separating and spanning the space between the inner and outer shells and dividing said space into a plurality of longitudinally extending passages; and
(d) means connecting the passages between said partitions into at least two independent, internested, labyrinthine flow channels, including:
(e) flow diverting members located alternately at opposite ends of said apparatus and between the inner and outer shells, successive ones of said members spanning adjacent pairs of passages, each of said flow diverting members having a main portion between and spaced from said inner and outer shells and extending from the associated end wall to the partitions forming the pair of adjacent passages spanned by the member, means comprising a first portion extending from said main portion into engagement with said outer shell for diverting fluid from one of said adjacent passages into a first space between said member and the inner shell and means comprising a second portion extending from said main portion into engagement with said inner shell for diverting fluid from the other of said adjacent passages into a second space between said member and the outer shell; and
(f) means for communicating said first and second spaces with passages adjacent those spanned by each of said flow diverting members.

7. The heat exchange apparatus of claim 2, wherein said seal has a plurality of generally parallel rings and said first and second seal portions are normal to said rings.

8. The heat exchange apparatus of claim 7, wherein the seal means further includes longitudinally oriented rings fixed between adjacent ones of said parallel rings, alternate ones of said longitudinal rings being at the outer and inner edges of said parallel rings.

9. The heat exchange apparatus of claim 2, wherein the annular seal has an arcuate cross sectional configuration.

10. Heat exchange apparatus adapted to have a fluid heat transfer medium circulated therethrough to maintain an external surface of said apparatus at a uniform, predetermined temperature, comprising:
(a) concentric, spaced apart inner and outer shells;
(b) end walls fixed to said shells at the opposite ends thereof;
(c) longitudinally extending, radially oriented partitions separating and spanning the space between the inner and outer shells and dividing said space into a plurality of longitudinally extending passages comprising main partitions extending from one to the other of said end walls and intermediate partitions between adjacent main partitions extending from one of said end walls toward but terminating short of the other end wall, successive ones of said intermediate partitions extending from opposite ones of said end walls;
(d) means connecting the passages between said partitions into at least two independent, internested, labyrinthine flow channels, including:
(e) flow diverting members located alternately at opposite ends of said apparatus and between the inner and outer shells, successive ones of said members extending between adjacent ones of said main partitions and thereby spanning the adjacent passages formed by two adjacent main partitions and the intermediate partition therebetween, each said flow diverting member having a main portion between and spaced from said inner and outer shells and engaging the associated main partitions and end wall, a first portion extending from said main portion into engagement with said outer shell, said first portion extending between the first of said main partitions and the intermediate partition therebetween and thereby diverting the fluid flowing through the passage between the last named partitions into a first space between said member and the inner shell, and a second portion extending from said main portion into engagement with said inner shell, said second portion extending between the second of said main partitions and the intermediate partition and thereby diverting the fluid flowing through the passage between the last-named partitions into a second space between said member and the outer shell; and
(f) apertures in the end portions of the first and second main partitions which are respectively between the main body portion of the flow diverting members and the outer and inner shells and thereby communicate said first and second spaces with passages adjacent those formed by the main and intermediate partitions with which the flow diverting member is associated.

References Cited by the Examiner
UNITED STATES PATENTS

| | | | |
|---|---|---|---|
| 1,671,819 | 5/1928 | Evans | 165—89 |
| 1,806,490 | 5/1931 | Naumann | 165—89 |
| 3,169,050 | 2/1965 | Kroon | 165—90 |
| 3,187,809 | 6/1965 | Spears | 165—90 |

FOREIGN PATENTS 481,096   2/1952   Canada.

JAMES W. WESTHAVER, *Primary Examiner.*
CHARLES SUKALO, *Examiner.*